(12) United States Patent
Sheard et al.

(10) Patent No.: US 8,779,058 B2
(45) Date of Patent: *Jul. 15, 2014

(54) HIGH MELT FLOW PROPYLENE IMPACT COPOLYMER AND METHOD

(76) Inventors: William G. Sheard, Houston, TX (US); Jeffrey D. Goad, Barboursville, WV (US); Linfeng Chen, Sugar Land, TX (US)

( * ) Notice: Subject to any disclaimer, the term of this patent is extended or adjusted under 35 U.S.C. 154(b) by 547 days.

This patent is subject to a terminal disclaimer.

(21) Appl. No.: 13/059,490

(22) PCT Filed: Feb. 23, 2009

(86) PCT No.: PCT/US2009/034881
§ 371 (c)(1),
(2), (4) Date: Feb. 17, 2011

(87) PCT Pub. No.: WO2010/082943
PCT Pub. Date: Jul. 22, 2010

(65) Prior Publication Data
US 2012/0130018 A1    May 24, 2012

Related U.S. Application Data

(63) Continuation of application No. 12/390,897, filed on Feb. 23, 2009, now Pat. No. 8,067,510, which is a continuation-in-part of application No. PCT/US2008/073882, filed on Aug. 21, 2008.

(60) Provisional application No. 60/957,888, filed on Aug. 24, 2007.

(51) Int. Cl.
*C08K 5/101* (2006.01)
*C08L 23/10* (2006.01)
*C08L 23/16* (2006.01)

(52) U.S. Cl.
USPC .......................... 524/773; 524/855; 525/240

(58) Field of Classification Search
USPC ........... 525/53, 191, 197, 240; 524/700, 729, 524/773, 849, 855
See application file for complete search history.

(56) References Cited

U.S. PATENT DOCUMENTS

| | | | |
|---|---|---|---|
| 4,882,380 A | 11/1989 | Ficker et al. | |
| 5,192,732 A | 3/1993 | Duranel et al. | |
| 5,432,244 A | 7/1995 | Rebhan | |
| 5,453,466 A | 9/1995 | Pellegatti et al. | |
| 5,461,115 A | 10/1995 | Oka | |
| 5,529,850 A | 6/1996 | Morini et al. | |
| 5,652,303 A | 7/1997 | Ishimaru et al. | |
| 6,005,034 A | 12/1999 | Hayashida et al. | |
| 6,214,939 B1 | 4/2001 | Shinozaki et al. | |
| 6,900,281 B2 | 5/2005 | Streeky et al. | |
| 7,141,635 B2 | 11/2006 | Chen et al. | |
| 7,226,977 B2 | 6/2007 | Kim et al. | |
| 7,238,758 B2 | 7/2007 | Yoshikiyo et al. | |
| 8,067,510 B2 * | 11/2011 | Sheard et al. ................... | 526/65 |
| 2004/0127656 A1 | 7/2004 | Bauch | |
| 2005/0143510 A1 | 6/2005 | Nakayama et al. | |
| 2006/0167194 A1 | 7/2006 | Chen et al. | |
| 2009/0118118 A1 | 5/2009 | Chen et al. | |
| 2009/0259006 A1 | 10/2009 | Kobayashi et al. | |

FOREIGN PATENT DOCUMENTS

| | | |
|---|---|---|
| EP | 0385765 | 9/1990 |
| EP | 0676419 | 10/1995 |
| EP | 0728769 | 8/1996 |
| EP | 0736552 | 10/1996 |
| EP | 1244717 | 1/2004 |
| EP | 1980576 | 10/2008 |
| EP | 1935938 | 6/2009 |
| JP | 06145269 | 5/1994 |
| WO | 03059966 | 7/2003 |
| WO | 2005030815 | 4/2005 |
| WO | 2006067052 | 6/2006 |
| WO | 2007088887 | 8/2007 |
| WO | 2009029487 | 3/2009 |

OTHER PUBLICATIONS

Cui, N. et al. Journal of Applied Polymer Science vol. 99 pp. 1399-1404 published online on Nov. 28, 2005.*
PCT Notification of Transmittal of the International Search Report and the Written Opinion of the International Searching Authority, or the Declaration, mailed Jul. 8, 2009 for the International Patent Application No. PCT/US2009/034881, filed on Feb. 23, 2009.
PCT Notification of Transmittal of the International Search Report and The Written Opinion of the International Searching Authority, or theDeclaration, mailed Feb. 10, 2009 for International Patent Application No. PCT/US2008/073882, filed on Aug. 21, 2008.

* cited by examiner

*Primary Examiner* — Irina S Zemel
*Assistant Examiner* — Jeffrey Lenihan
(74) *Attorney, Agent, or Firm* — Lerner, David, Littenberg, Krumholz & Mentlik, LLP

(57) ABSTRACT

The present disclosure provides a polymerization process for the production of a high melt flow propylene impact copolymer. The process includes contacting an active propylene-based polymer having a melt flow rate greater than about 100 g/10 min with one or more olefins in a polymerization reactor to form the propylene impact copolymer with a melt flow rate greater than about 60 g/10 min. The production of the high melt flow propylene impact copolymer may occur in one or more polymerization reactors, utilizing standard hydrogen concentration, and no visbreaking.

19 Claims, No Drawings

HIGH MELT FLOW PROPYLENE IMPACT COPOLYMER AND METHOD

CROSS-REFERENCE TO RELATED APPLICATIONS

The present application is a national phase entry under 35 U.S.C. §371 of International Application No. PCT/US2009/034881 filed Feb. 23, 2009, published Jul. 22, 2010, which is a continuation of U.S. patent application Ser. No. 12/390,897 filed Feb. 23, 2009 now U.S. Pat. No. 8,067,510, which is a continuation-in-part application of International Patent Application No. PCT/US2008/073882 filed Aug. 21, 2008 which claims priority to U.S. Provisional Patent Application No. 60/957,888 filed Aug. 24, 2007, the entire contents of which are incorporated by reference herein.

BACKGROUND

The demand for propylene impact copolymers with high melt flow continues to increase as the need for more sophisticated polymers continues to grow. In-reactor propylene impact copolymers are copolymers produced by way of polymerization, and do not include visbreaking, for example. It is difficult to produce high melt flow propylene impact copolymers directly by polymerization. Conventional polymerization catalysts typically require the use of very high hydrogen concentrations for the formation of a matrix phase polymer with a melt flow greater than the melt flow of the final propylene impact copolymer. In many cases, provision of a high hydrogen concentration is not possible due to reactor operability limits, safety concerns, and/or economic considerations.

Desirable is a polymerization process for the production of a high melt flow propylene impact copolymer. Further desired is a process for the production of a high melt flow propylene impact copolymer with high impact strength. Further desired is a process for the production of a high melt flow propylene impact copolymer with high impact strength with reduced risk, or no risk, of process disruption.

SUMMARY

The present disclosure provides polymerization processes for the production of a propylene impact copolymer with a high melt flow rate. The high melt flow propylene impact copolymer may also have high impact strength. The present processes are in-reactor processes and do not include visbreaking.

In an embodiment, a polymerization process is provided. The polymerization process includes gas phase polymerizing, or forming by way of gas phase polymerization, an active propylene-based polymer in a first polymerization reactor. The active propylene-based polymer has a melt flow rate greater than about 100 g/10 min as measured in accordance with ASTM D1238-01 (230° C., 2.16 kg). The process includes introducing the active propylene-based polymer into a second polymerization reactor. In the second reactor, the propylene-based polymer is contacted with at least one olefin under polymerization conditions. The process further includes forming a propylene impact copolymer having a melt flow rate greater than about 60 g/min.

In an embodiment, the process includes maintaining a $H_2/C_3$ mole ratio of less than 0.3 in one, or both, reactors.

In an embodiment, the process includes forming a propylene impact copolymer having a volatiles content of less than about 65 μg/g. Volatiles content is measured in accordance with VW standard PV3341.

The present disclosure provides another process. In an embodiment, a polymerization process is provided which includes contacting at least one olefin with an active propylene-based polymer in a polymerization reactor under polymerization conditions. The active propylene-based polymer has a melt flow rate greater than about 100 g/10 min. The process further includes forming a propylene impact copolymer having a melt flow rate greater than about 85 g/10 min.

In an embodiment, the polymerization reactor is a gas phase polymerization reactor.

In an embodiment, the process includes maintaining a $H_2/C_3$ mole ratio less than 0.20 in the reactor.

In an embodiment, the process includes forming a propylene impact copolymer having a volatiles content of less than about 65 μg/g.

The present disclosure provides a composition. In an embodiment, a propylene impact copolymer is provided which includes a propylene-based polymer having a melt flow rate greater than about 100 g/10 min and a propylene/ethylene copolymer dispersed within the propylene-based polymer. The propylene impact copolymer has an Fc value from about 5 wt % to about 50 wt % and an Ec value from about 20 wt % to about 90 wt %. The propylene impact copolymer has a melt flow rate greater than about 60 g/10 min.

An advantage of the present disclosure is the provision of an improved process for the production of propylene impact copolymer and the production of high melt flow propylene impact copolymer in particular.

An advantage of the present disclosure is the provision of an improved propylene impact copolymer.

An advantage of the present copolymer is the provision of an uncracked propylene impact copolymer having high melt flow.

DETAILED DESCRIPTION

In an embodiment, a polymerization process is provided. The polymerization process includes gas phase polymerizing (or forming by way of gas phase polymerization) an active propylene-based polymer having a melt flow rate (MFR) greater than about 100 g/10 min. MFR is measured in accordance with ASTM D1238-01 (230° C., 2.16 kg). The active propylene-based polymer is formed in a first polymerization reactor under polymerization (i.e., gas phase polymerization) conditions. The process further includes introducing the active propylene-based polymer into a second polymerization reactor where the active propylene-based polymer is contacted with at least one olefin other than propylene under polymerization conditions. The process further includes forming a propylene impact copolymer having a melt flow rate greater than about 60 g/10 min.

As used herein, an "active polymer" is a polymer containing an amount of active catalyst (typically embedded therein) that is capable of further polymerization upon exposure to an olefin under polymerization conditions. In an embodiment, the active catalyst embedded in the active propylene-based polymer is a self-limiting catalyst composition which includes a procatalyst composition, a cocatalyst, and a mixed external electron donor (M-EED). The M-EED includes a first selectivity control agent (SCA1), a second selectivity control agent, (SCA2) and an activity limiting agent (ALA). It is understood that the M-EED may include three or more SCAs and/or two or more ALAs.

The procatalyst composition of the present catalyst composition may be a Ziegler-Natta procatalyst composition. Any conventional Ziegler-Natta procatalyst may be used in the present catalyst composition. In an embodiment, the Ziegler-Natta procatalyst composition contains a transition metal compound and a Group 2 metal compound. The transition metal compound may be a solid complex derived from a transition metal compound, for example, titanium-, zirconium-, chromium- or vanadium-hydrocarbyloxides, hydrocarbyls, halides, or mixtures thereof.

The transition metal compound has the general formula $TrX_x$ where Tr is the transition metal, X is a halogen or a $C_{1-10}$ hydrocarboxyl or hydrocarbyl group, and x is the number of such X groups in the compound in combination with a Group 2 metal compound. Tr may be a Group 4, 5 or 6 metal. In an embodiment, Tr is a Group 4 metal, such as titanium. X may be chloride, bromide, $C_{1-4}$ alkoxide or phenoxide, or a mixture thereof. In an embodiment, X is chloride.

Nonlimiting examples of suitable transition metal compounds that may be used to form the Ziegler-Natta procatalyst composition are $TiCl_4$, $ZrCl_4$, $HfCl_4$, $TiBr_4$, $TiCl_3$, $Ti(OC_2H_5)_3Cl$, $Zr(OC_2H_5)_3Cl$, $Ti(OC_2H_5)_3Br$, $Ti(OC_3H)_2Cl_2$, $Ti(OC_6H_5)_2Cl_2$, $Zr(OC_2H_5)_2Cl_2$, and $Ti(OC_2H_5)Cl_3$. Mixtures of such transition metal compounds may be used as well. No restriction on the number of transition metal compounds is made as long as at least one transition metal compound is present. In an embodiment, the transition metal compound is a titanium compound.

Nonlimiting examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium. In an embodiment, the Group 2 metal compound is magnesium dichloride.

In an embodiment, the Ziegler-Natta procatalyst composition is a mixture of titanium moieties supported on or otherwise derived from magnesium compounds. Suitable magnesium compounds include anhydrous magnesium chloride, magnesium chloride adducts, magnesium dialkoxides or aryloxides, or carboxylated magnesium dialkoxides or aryloxides. In an embodiment, the magnesium compound is a magnesium di($C_{1-4}$)alkoxide, such as diethoxymagnesium.

Nonlimiting examples of suitable titanium moieties include titanium alkoxides, titanium aryloxides, and/or titanium halides. Compounds used to prepare the Ziegler-Natta procatalyst composition include one or more magnesium-di ($C_{1-4}$)alkoxides, magnesium dihalides, magnesium alkoxyhalides, or mixtures thereof and one or more titanium tetra ($C_{1-4}$) alkoxides, titanium tetrahalides, titanium($C_{1-4}$) alkoxyhalides, or mixtures thereof.

A precursor composition may be used to prepare the Ziegler-Natta procatalyst composition as is commonly known in art. The precursor composition may be prepared by the chlorination of the foregoing mixed magnesium compounds, titanium compounds, or mixtures thereof, and may involve the use of one or more compounds, referred to as "clipping agents", that aid in forming or solubilizing specific compositions via a solid/solid metathesis. Nonlimiting examples of suitable clipping agents include trialkylborates, especially triethylborate, phenolic compounds, especially cresol, and silanes.

In an embodiment, the precursor composition is a mixed magnesium/titanium compound of the formula $Mg_dTi(OR_e)_fX_g$ wherein $R_e$ is an aliphatic or aromatic hydrocarbon radical having 1 to 14 carbon atoms or COR' wherein R' is an aliphatic or aromatic hydrocarbon radical having 1 to 14 carbon atoms; each $OR_3$ group is the same or different; X is independently chlorine, bromine or iodine; d is 0.5 to 56, or 2-4; or 3; f is 2-116, or 5-15; and g is 0.5-116, or 1-3, or 2. The precursor may be prepared by controlled precipitation through removal of an alcohol from the reaction mixture used in its preparation. In an embodiment, the reaction medium comprises a mixture of an aromatic liquid, especially a chlorinated aromatic compound, such as chlorobenzene, with an alkanol, especially ethanol, and an inorganic chlorinating agent. Suitable inorganic chlorinating agents include chlorine derivatives of silicon, aluminum and titanium, such as titanium tetrachloride or titanium trichloride, and titanium tetrachloride in particular. The chlorinating agents lead to partial chlorination which results in a precursor containing relatively high level of alkoxy component(s). Removal of the alkanol from the solution used in the chlorination, results in precipitation of the solid precursor, having a desirable morphology and surface area. The precursor was separated from the reaction media. Moreover, the resulting precursor is particularly uniform particle sized and resistant to particle crumbling as well as degradation of the resulting procatalyst. In an embodiment, the precursor composition is $Mg_3Ti(OEt)_8Cl_2$.

The precursor is next converted to a solid procatalyst by further reaction (halogenation) with an inorganic halide compound, preferably a titanium halide compound, and incorporation of an internal electron donor. If not already incorporated into the precursor in sufficient quantity, the internal electron donor may be added separately before, during or after halogenation. This procedure may be repeated one or more times, optionally in the presence of additional additives or adjuvants, and the final solid product washed with an aliphatic solvent. Any method of making, recovering and storing the solid procatalyst is suitable for use in the present disclosure.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride. The optional hydrocarbon or halohydrocarbon solvent employed in the production of olefin polymerization procatalyst preferably contains up to 12 carbon atoms inclusive, or up to 9 carbon atoms inclusive. Exemplary hydrocarbons include pentane, octane, benzene, toluene, xylene, alkylbenzenes, and decahydronaphthalene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. The aliphatic halohydrocarbon may be a compound containing at least two chloride substituents such as carbon tetrachloride or 1,1,2-trichloroethane. The aromatic halohydrocarbon may be chlorobenzene or o-chlorotoluene.

The halogenation may be repeated one or more times, optionally accompanied by washing with an inert liquid such as an aliphatic or aromatic hydrocarbon or halohydrocarbon between halogenations and following halogenation. Further optionally one or more extractions involving contacting with an inert liquid diluent, especially an aliphatic or aromatic hydrocarbon, or aliphatic or aromatic halohydrocarbon, especially at an elevated temperature greater than 100° C., or greater than 110° C., may be employed to remove labile species, especially $TiCl_4$.

In an embodiment, the Ziegler-Natta procatalyst composition includes a solid catalyst component obtained by (i) suspending a dialkoxy magnesium in an aromatic hydrocarbon or halohydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

In an embodiment, the Ziegler-Natta procatalyst composition includes a solid catalyst component obtained by (i) suspending a precursor material of the formula $Mg_d Ti(OR_e)_f X_g$ (as described previously) in an aromatic hydrocarbon or halohydrocarbon that is liquid at normal temperatures, (ii) contacting the precursor with a titanium halide and further (iii) contacting the resulting composition a second time with the titanium halide, and contacting the precursor with a diester of an aromatic dicarboxylic acid at some point during the treatment with the titanium halide in (ii).

The procatalyst composition includes an internal electron donor. As used herein, an "internal electron donor" is a compound added or otherwise formed during formation of the procatalyst composition that donates a pair of electrons to one or more metals present in the resultant procatalyst composition. Not bounded by any particular theory, it is believed that the internal electron donor assists in regulating the formation of active sites, thereby enhancing catalyst stereoselectivity.

In an embodiment, the internal electron donor is a bidentate compound. A "bidentate compound," as used herein, is a compound containing at least two oxygen-containing functional groups, the oxygen-containing functional groups separated by at least one saturated $C_2$-$C_{10}$ hydrocarbon chain which may optionally contain heteroatom(s). The bidentate compound may be a phthalate, a diether, a succinate, a phenylene dibenzoate, a maleate, a malonate, a glutarate, a dialkoxybenzene, a bis(alkoxyphenyl), a diol ester, a ketoester, an alkoxyalkyl ester, a bis(alkoxyalkyl)fluorene, and any combination thereof.

In an embodiment, the internal electron donor is diisobutyl phthalate and/or di-n-butyl phthalate.

In an embodiment, the internal electron donor is 9,9-bis (methoxymethyl)-9H-fluorene.

In an embodiment, the internal electron donor is a phenylene dibenzoate.

The Ziegler-Natta procatalyst composition may also include an inert support material. The support may be an inert solid which does not adversely alter the catalytic performance of the transition metal compound. Examples include metal oxides, such as alumina, and metalloid oxides, such as silica.

The present catalyst composition includes a cocatalyst. The cocatalyst for use with the foregoing Ziegler-Natta procatalyst composition may be an aluminum containing composition. Nonlimiting examples of suitable aluminum containing compositions include organoaluminum compounds, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10, or 1-6 carbon atoms in each alkyl- or alkoxide-group. In an embodiment, the cocatalyst is a $C_{1-4}$ trialkylaluminum compound, such as triethylaluminum (TEA or TEAl). The molar ratio of aluminum to titanium is 10-200:1, or 35-50:1. In an embodiment, the molar ratio of aluminum to titanium to 45:1.

The present catalyst composition includes a mixed external electron donor (M-EED) which includes a first selectivity control agent (SCA1), a second selectivity control agent (SCA2), and an activity limiting agent (ALA). As used herein, an "external electron donor" (or "EED") is a compound added independent of procatalyst formation that contains at least one functional group that is capable of donating a pair of electrons to a metal atom. Bounded by no particular theory, it is believed that provision of one or more external electron donors in the catalyst composition affects the following properties of the formant polymer: level of tacticity (i.e., xylene soluble material), molecular weight (i.e., melt flow), molecular weight distribution (MWD), melting point, and/or oligomer level.

Nonlimiting examples of suitable compounds for the SCA include silicon compounds, such as alkoxysilanes; ethers and polyethers, such as alkyl-, cycloalkyl-, aryl-, mixed alkyl/aryl-, mixed alkyl/cycloalkyl-, and/or mixed cycloalkyl/aryl-ethers and/or polyethers; esters and polyesters, especially alkyl, cycloalkyl- and/or aryl-esters of monocarboxylic or dicarboxylic acids, such as aromatic monocarboxylic- or dicarboxylic-acids; alkyl- or cycloalkyl-ether or thioether derivatives of such esters or polyesters, such as alkyl ether derivatives of alkyl esters or diesters of aromatic monocarboxylic or dicarboxylic acids; and Group 15 or 16 heteroatom-substituted derivatives of all of the foregoing; and amine compounds, such as cyclic, aliphatic or aromatic amines, more especially pyrrol or pyridine compounds; all of the foregoing SCA's containing from 2 to 60 carbons total and from 1 to 20 carbons in any alkyl or alkylene group, 3 to 20 carbons in any cycloalkyl or cycloalkylene group, and 6 to 20 carbons in any aryl or arylene group.

In an embodiment, SCA1 and/or SCA2 is a silane composition having the general formula (I):

$$SiR_m(OR')_{4-m} \qquad (I)$$

wherein R independently each occurrence is hydrogen or a hydrocarbyl or an amino group, optionally substituted with one or more substituents containing one or more Group 14, 15, 16, or 17 heteroatoms. R contains up to 20 atoms not counting hydrogen and halogen R' is a $C_{1-20}$ alkyl group, and m is 0, 1, or 2. In an embodiment, R is $C_{6-12}$ aryl, alkyl or aralkyl, $C_{3-12}$ cycloalkyl, $C_{3-12}$ branched alkyl, or $C_{3-12}$ cyclic amino group, R' is $C_{1-4}$ alkyl, and m is 1 or 2.

In an embodiment, SCA1 is a dimethoxysilane. The dimethoxysilane may contain at least one secondary alkyl and/or one secondary amino group directly bonded to the silicon atom. Nonlimiting examples of suitable dimethoxysilanes include dicyclopentyldimethoxysilane, methylcyclohexyldimethoxysilane, diisopropyldimethoxysilane, isopropylisobutyldimethoxysilane, diisobutyldimethoxysilane, t-butylisopropyldimethoxysilane, cyclopentylpyrrolidinodimethoxysilane, bis(pyrrolidino)dimethoxysilane, bis(perhydroisoquinolino)dimethoxysilane, and any combination of the foregoing.

In an embodiment, SCA1 is a stiffness-promoting composition. A "stiffness-promoting composition," as used herein, is a composition that, but for operation according to the process conditions of the present disclosure, increases or otherwise enhances the stiffness of a resulting polymer under the polymerization conditions of interest. Nonlimiting examples of suitable stiffness-promoting include any of the dimethoxysilanes disclosed above.

In an embodiment, SCA1 is dicyclopentyldimethoxysilane.

In an embodiment, the SCA2 is a silicon compound selected from a diethoxysilane, a triethoxysilane, a tetraethoxysilane, a trimethoxysilane, a dimethoxysilane containing two linear alkyl groups, a dimethoxysilane containing two alkenyl groups, a diether, a dialkoxybenzene, and any combination thereof.

Nonlimiting examples of suitable silicon compounds for SCA2 include dimethyldimethoxysilane, vinylmethyldimethoxysilane, n-octylmethyldimethoxysilane, n-octadecylmethyldimethoxysilane, methyldimethoxysilane, 3-chloropropylmethyldimethoxysilane, 2-chloroethylmethyldimethoxysilane, allyldimethoxysilane, (3,3,3-trifluoropropyl)methyldimethoxysilane, n-propylmethyldimethoxysilane, chloromethylmethyldimethoxysilane, di-n-octyldimethoxysilane, vinyl(chloromethyl)dimethoxysilane, methylcyclohexyldiethoxysilane, vinylimethyldiethoxysilane, 1-(triethoxysilyl)-2-(diethoxymethylsilyl)ethane, n-octylmethyldiethoxysilane, octaethoxy-1,3,5-trisilapentane, n-octadecylmethyldiethoxysilane, methacryloxypropylmethyldiethoxysilane, 2-hydroxy-4-(3-methyldiethoxysilyl-propoxy)diphenylketone, (3-glycidoxypropyl)methyldiethoxysilane, dodecylmethyldiethoxysilane, dimethyldiethoxysilane, diethyldiethoxysilane, 1,1-diethoxy-1-silacyclopent-3-ene, chloromethylmethyldiethoxysilane, bis(methyldiethoxysilylpropyl)amine, 3-aminopropylmethyldiethoxysilane, (methacryloxymethyl)methyldiethoxysilane, 1,2-bis(methyldiethoxysilyl)ethane, and diisobutyldiethoxysilane, vinyltrimethoxysilane, vinyltriethoxysilane, benzyltriethoxysilane, butenyltriethoxysilane, (triethoxysilyl)cyclohexane, O-(vinyloxybutyl)-N-triethoxysilylpropylcarbamate, 10-undecenyltrimethoxysilane, n-(3 trimethoxysilylpropyl)pyrrole, N-[5-(trimethoxysilyl)-2-aza-1-oxopentyl]caprolactam, (3,3,3-trifluoropropyl)trimethoxysilane, triethoxysilylundecanal ethylene glycol acetal, (S)—N-triethoxysilylpropyl-O-menthocarbamate, triethoxysilylpropylethylcarbamate, N-(3-triethoxysilylpropyl)-4,5-dihydroimidazole, (3-triethoxysilylpropyl)-t-butylcarbamate, styrylethyltrimethoxysilane, 2-(4-pyridylethyl)triethoxysilane, n-propyltrimethoxysilane, n-propyltriethoxysilane, (S)—N-1-phenylethyl-N'-triethoxysilylpropylurea, (R)—N-1-phenylethyl-N'-triethoxysilylpropylurea, N-phenylaminopropyltrimethoxysilane, N-phenylaminomethyltriethoxysilane, phenethyltrimethoxysilane, pentyltriethoxysilane, n-octyltrimethoxysilane, n-octyltriethoxysilane, 7-octenyltrimethoxysilane, S-(octanoyl)mercaptopropyltriethoxysilane, n-octadecyltrimethoxysilane, n-octadecyltriethoxysilane, methyltrimethoxysilane, methyltriethoxysilane, N-methylaminopropyltrimethoxysilane, 3-methoxypropyltrimethoxysilane, methacryloxypropyltrimethoxysilane, methacryloxypropyltriethoxysilane, methacryloxymethyltrimethoxysilane, methacryloxymethyltriethoxysilane, and O-(methacryloxyethyl)-N-(triethoxysilylpropyl)carbamate, tetramethoxysilane and/or tetraethoxysilane.

In an embodiment, SCA2 may be methylcyclohexyldiethoxysilane, di-isobutyldiethoxysilane, n-propyltriethoxysilane, tetraethoxysilane, di-n-butyl-dimethoxysilane, benzyltriethoxysilane, but-3-enyltriethoxysilane, 1-(triethoxysilyl)-2-pentene, (triethoxysilyl)cyclohexane, and any combination of the foregoing.

In an embodiment, the SCA2 is selected from a dimethoxysilane containing two linear alkyl groups, a dimethoxysilane containing two alkenyl groups or hydrogen, wherein one or more hydrogen atoms may be substituted by a halogen, and any combination thereof.

In an embodiment, SCA2 may be a diether, a dimer of a diether, a dialkoxybenzene, a dimmer of a dialkoxybenzene, a dialkoxybenzene linked by a linear hydrocarbon group, and any combination thereof. It is noted that the diethers for the ALA set forth below apply equally as nonlimiting examples for the SCA2 diether.

In an embodiment, SCA2 is a melt flow-promoting composition. A "melt flow-promoting composition," as used herein, is a composition that, but for operation according to the process conditions of the present disclosure, increases the melt flow rate of a resulting polymer under the polymerization conditions of interest. The melt-flow promoting composition may be any silane composition suitable as SCA2 as disclosed above, a diether, an alkoxybenzene, an ester, a ketone, an amide, and/or an amine.

The M-EED includes an activity limiting agent (ALA). An "activity limiting agent," as used herein is a material that reduces catalyst activity at elevated temperature, namely in a polymerization reactor at polymerization, conditions at a temperature greater than about 100° C. Provision of the ALA results in a self-limiting catalyst composition. As used herein, a "self-limiting" catalyst composition is a catalyst composition that demonstrates decreased activity at a temperature greater than about 100° C. In other words, "self-limiting" is the decline of catalyst activity when the reaction temperature rises above 100° C. compared to the catalyst activity under normal polymerization conditions with reaction temperature usually below 80° C. In addition, as a practical standard, if a polymerization process, such as a fluidized bed, gas-phase polymerization running at normal processing conditions is capable of interruption and resulting collapse of the bed with reduced risk with respect to agglomeration of polymer particles, the catalyst composition is said to be "self-limiting."

As a standardized measure of polymerization activity at elevated temperatures for use herein, catalyst activities are adjusted to compensate for different monomer concentrations due to temperature. For example, if liquid phase (slurry or solution) polymerization conditions are used, a correction factor to account for reduced propylene solubility in the reaction mixture at elevated temperatures is included. That is, the catalyst activity is "normalized" to compensate for the decreased solubility compared to the lower temperature, especially a 67° C. standard. The "normalized" activity, at temperature T, or $A_T$, is defined as the measured activity or (weight polymer/weight catalyst/hr) at temperature T, multiplied by a concentration correction factor, [P(67)]/[P(T)], where [P(67)] is the propylene concentration at 67° C. and [P(T)] is the propylene concentration at temperature T. The equation for normalized activity is provided below.

$$\text{Normalized Activity } (A) = \cdot \frac{[P(67)]}{[P(T)]} \times \text{Activity } (T)$$

In the equation, the activity at temperature T is multiplied by a ratio of the propylene concentration at 67° C. to the propylene concentration at temperature T. The resulting normalized activity (A), adjusted for the decrease in propylene concentration with temperature increase, may be used for comparison of catalyst activities under varying temperature conditions. The correction factors are listed below for the conditions used in the liquid phase polymerization.

| 67° C. | 85° C. | 100° C. | 115° C. | 130° C. | 145° C. |
|---|---|---|---|---|---|
| 1.00 | 1.42 | 1.93 | 2.39 | 2.98 | 3.70 |

The correction factor assumes that polymerization activity increases linearly with propylene concentration under the conditions employed. The correction factor is a function of the solvent or diluent used. For example, the correction factors listed above are for a common $C_{6-10}$ aliphatic hydrocarbon mixture (Isopar™ E, available from Exxon Chemical Company). Under gas phase polymerization conditions, monomer solubility is normally not a factor and activity is generally uncorrected for temperature difference. That is, activity and normalized activity are the same.

The "normalized activity ratio" is defined as $A_T/A_{67}$, where $A_T$ is the activity at temperature T and $A_{67}$ is the activity at 67° C. This value can be used as an indicator of activity change as a function of temperature. For example, an $A_{100}/A_{67}$ equal to 0.30 shows that the catalyst activity at 100° C. is only 30 percent of the catalyst activity at 67° C. It has been found that at 100° C., an $A_{100}/A_{67}$ ratio of 35% or less yields a catalyst system that is self-extinguishing system.

The ALA may be an aromatic ester or a derivative thereof, an aliphatic ester or derivative thereof, a diether, a poly(alkylene glycol) ester, and combinations thereof. Nonlimiting examples of suitable aromatic esters include $C_{1-10}$ alkyl or cycloalkyl esters of aromatic monocarboxylic acids. Suitable substituted derivatives thereof include compounds substituted both on the aromatic ring(s) or the ester group with one or more substituents containing one or more Group 14, 15 or 16 heteroatoms, especially oxygen. Examples of such substituents include (poly)alkylether, cycloalkylether, arylether, aralkylether, alkylthioether, arylthioether, dialkylamine, diarylamine, diaralkylamine, and trialkylsilane groups. The aromatic carboxylic acid ester may be a $C_{1-20}$ hydrocarbyl ester of benzoic acid wherein the hydrocarbyl group is unsubstituted or substituted with one or more Group 14, 15 or 16 heteroatom containing substituents and $C_{1-20}$ (poly)hydrocarbyl ether derivatives thereof, or $C_{1-4}$ alkyl benzoates and $C_{1-4}$ ring alkylated derivatives thereof, or methyl benzoate, ethyl benzoate, propyl benzoate, methyl p-methoxybenzoate, methyl p-ethoxybenzoate, ethyl p-methoxybenzoate, and ethyl p-ethoxybenzoate. In an embodiment, the aromatic carboxylic acid ester is ethyl p-ethoxybenzoate.

In an embodiment, the ALA is an aliphatic ester. The aliphatic ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ alkyl mono- and diesters of aliphatic $C_{4-20}$ monocarboxylic acids and dicarboxylic acids, $C_{1-4}$ alkyl esters of aliphatic $C_{1-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be isopropyl myristate and/or di-n-butyl sebacate.

In an embodiment, the ALA is isopropyl myristate.

In an embodiment, the ALA is a diether. The diether may be a dialkyl diether represented by the following formula,

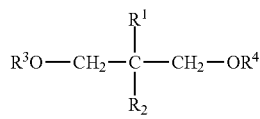

wherein $R^1$ to $R^4$ are independently of one another an alkyl, aryl or aralkyl group having up to 20 carbon atoms, which may optionally contain a group 14, 15, 16, or 17 heteroatom, provided that $R^1$ and $R^2$ may be a hydrogen atom. Nonlimiting examples of suitable dialkyl ether compounds include dimethyl ether, diethyl ether, dibutyl ether, methyl ethyl ether, methyl butyl ether, methyl cyclohexyl ether, 2,2-dimethyl-1,3-dimethoxypropane, 2,2-diethyl-1,3-dimethoxypropane, 2,2-di-n-butyl-1,3-dimethoxypropane, 2,2-diisobutyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane, 2-isopropyl-2-isobutyl-1,3-dimethoxypropane, 2,2-dicyclopentyl-1,3-dimethoxypropane, 2-n-propyl-2-cyclohexyl-1,3-diethoxypropane, and 9,9-bis(methoxymethyl)fluorene. In a further embodiment, the dialkyl ether compound is 2,2-diisobutyl-1,3-dimethoxypropane.

In an embodiment, the ALA is a poly(alkylene glycol) ester. Nonlimiting examples of suitable poly(alkylene glycol) esters include poly(alkylene glycol) mono- or diacetates, poly(alkylene glycol) mono- or di-myristates, poly(alkylene glycol) mono- or di-laurates, poly(alkylene glycol) mono- or di-oleates, glyceryl tri(acetate), glyceryl tri-ester of $C_{2-40}$ aliphatic carboxylic acids, and any combination thereof. In an embodiment, the poly(alkylene glycol) moiety of the poly(alkylene glycol) ester is a poly(ethylene glycol).

In an embodiment, the molar ratio of aluminum to ALA may be 1.4-85:1, or 2.0-50:1, or 4-30:1. For ALA that contains more than one carboxylate group, all the carboxylate groups are considered effective components. For example, a sebacate molecule contains two carboxylate functional groups is considered to have two effective functional molecules.

In an embodiment, the catalyst composition includes a mole ratio of Al to M-EED of 0.5-25:1, or 1.0-20:1, or 1.5-15:1, or less than about 6.0, or less than about 5, or less than 4.5.

In an embodiment, the Al:M-EED mole ratio is 0.5-4.0:1. Not wishing to be bound by any particular theory, it is believed that the Al/M-EED ratio of 0.5:1 to 4.0:1 provides a sufficient amount of aluminum to support the polymerization reaction at normal polymerization temperatures. However, at elevated temperature (due to a temperature excursion or a process upset, for example), more aluminum species react with other catalyst components. This leads to an aluminum deficiency which slows the polymerization reaction. The aluminum deficiency causes a corresponding reduction in the number of electron donors complexed with the aluminum. The free electron pairs of the non-complexed donors poison the catalyst system, which self-extinguishes the reaction.

As used herein, "total-SCA" is the combined amount (in moles) of SCA1 and SCA2. In other words, total-SCA=SCA1 (mole)+SCA2 (mole). The amount of ALA in M-EED enhances catalyst self-limiting capability at elevated temperature, while the amount of SCA1 provides stiffness and SCA2 provides melt flow in the resultant polymer. The total-SCA to ALA mole ratio is 0.43-2.33:1, or 0.54-1.85:1, or 0.67-1.5:1. The SCA1 to total-SCA mole ratio is 0.2-0.5:1, 0.25-0.45:1, or 0.30-0.40:1. Applicants have surprisingly and unexpectedly discovered that a controlled mole ratio of: (1) SCA1 to SCA2, and/or (2) total-SCA to ALA and/or (3) SCA1 to total-SCA yields a resultant polymer with the unique properties of high melt flow and high stiffness in conjunction with the operability property of a self-limiting catalyst.

In an embodiment, the mole ratio of total-SCA to ALA is 0.43-2.33:1 and the mole ratio of SCA1 to total-SCA is 0.2-0.5:1.

In an embodiment, the catalyst composition includes a mole ratio of Al to total-SCA of 1.4-85:1, or 2.0-50:1, or 4.0-30:1.

In an embodiment, the catalyst composition includes a mole ratio of total-SCA to ALA that is less than 1.0. Surprisingly and unexpectedly, it has been found that maintaining the mole ratio of total-SCA to ALA to less than 1.0 significantly improves reactor operability.

In an embodiment, the M-EED comprises dicyclopentyldimethoxysilane (SCA1), a melt-flow promoting composition (SCA2), and isopropyl myristate (ALA). In a further embodiment, SCA2 is selected from methylcyclohexyldiethoxysilane, diisobutyldiethoxysilane, di-n-butyldimethoxysilane, n-propyltriethoxysilane, benzyltriethoxysilane, butenyltriethoxysilane, (triethoxysilyl)cyclohexane, tetraethoxysilane, 1-ethoxy-2-(6-(2-ethoxyphenoxy)hexyloxy)benzene, 1-ethoxy-2-n-pentoxybenzene, and any combination thereof.

The mole ratios between various components of the present catalyst composition are set forth below in Table 1.

TABLE 1

| Mole Ratio | Range |
| --- | --- |
| Al to Ti | 10-200:1 |
| Al to M-EED | 0.5-25:1 |
| Ti to M-EED | 1-100:1 |
| Al to total-SCA | 1.4-85:1 |
| Al to ALA | 1.4-85:1 |
| total-SCA to ALA | 0.43-2.33:1 |
| SCA1 to SCA2 | 0.1-1.0:1 |
| SCA1 to total-SCA | 0.2-0.5:1 |

The present catalyst composition may comprise two or more embodiments disclosed herein.

In an embodiment, the formation of the active propylene-based polymer occurs by way of a gas phase polymerization process whereby the catalyst composition is contacted with propylene and optionally one or more olefins in the first polymerization reactor. One or more olefin monomers can be optionally introduced into the first polymerization reactor along with the propylene to react with the catalyst and to form a polymer, a copolymer, (or a fluidized bed of polymer particles). Nonlimiting examples of suitable olefin monomers include ethylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, polymerization reactor. Accordingly, the polymerization reactor may be a gas phase polymerization reactor, a liquid-phase polymerization reactor, or a combination thereof.

It is understood that provision of hydrogen in the polymerization reactor is a component of the polymerization conditions. During polymerization, hydrogen is a chain transfer agent and affects the molecular weight (and correspondingly the melt flow rate) of the resultant polymer.

In an embodiment, polymerization occurs by way of gas phase polymerization. As used herein, "gas phase polymerization," or "gas phase polymerizing," is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen. In an embodiment, the gas phase polymerization is performed in condensing mode.

In an embodiment, the contacting occurs by way of feeding the catalyst composition into the polymerization reactor and introducing the olefin into the polymerization reactor. In an embodiment, the process includes contacting the olefin with a cocatalyst. The cocatalyst can be mixed with the procatalyst composition (pre-mix) prior to the introduction of the procatalyst composition into the polymerization reactor. In another embodiment, cocatalyst is added to the polymerization reactor independently of the procatalyst composition. The independent introduction of the cocatalyst into the polymerization reactor can occur simultaneously, or substantially simultaneously, with the procatalyst composition feed.

In an embodiment, the process includes mixing or otherwise combining the M-EED with the procatalyst composition. The M-EED can be complexed with the cocatalyst and/or mixed with the procatalyst composition (pre-mix) prior to contact between the catalyst composition and the propylene. In another embodiment, the M-EED (or individual components thereof) may be added independently to the polymerization reactor.

In an embodiment, the polymerization process includes maintaining a hydrogen-to-propylene ("$H_2/C_3$") mole ratio less than 0.30 (i.e., 0.30:1), or less than 0.20, or less than 0.18, or less than 0.16, or less than 0.08 in the first reactor. Although high melt flow can be achieved by using high level of hydrogen, it has been found that propylene-based polymers produced by way of a $H_2/C_3$ mole ratio greater than 0.30 significantly accelerate an unwanted reaction of hydrogenation of propylene in the presence of oxidized carbon steel of a reactor and reduce catalyst activity. On the other hand, the resultant propylene-based polymer formed by way of the present process avoids excessive amounts of catalytic residue as the $H_2/C_3$ mole ratio is less than 0.3.

Moreover, a low $H_2/C_3$ mole ratio value, such as the present value of less than 0.30, improves catalyst productivity. As the value for the $H_2/C_3$ mole ratio increases, more hydrogen displaces greater amounts of propylene. Hydrogen displacement of propylene decreases the amount of propylene available for reaction with the catalyst composition. Thus, a large value for the $H_2/C_3$ mole ratio indicates that less propylene is available to polymerize. Less propylene available for reaction translates into less polymer produced—an indication of decreased catalyst activity and decreased reactor productivity.

Conversely, the present catalyst composition enables the formation of high melt flow propylene-based polymer by way of a low $H_2/C_3$ mole ratio, namely, a $H_2/C_3$ mole ratio of less than 0.3. Thus, the improved hydrogen response of the present catalyst composition improves catalyst activity and improves productivity.

In an embodiment, the polymerization process includes maintaining a hydrogen partial pressure below about 80 psi, or below about 71 psi, or below about 63 psi.

In an embodiment, the process includes self-limiting the polymerization process when the temperature in the reactor is greater than about 100° C.

In an embodiment, the process includes forming the propylene-based polymer in a single polymerization reactor.

Applicants have surprisingly and unexpectedly discovered that the presence of the mixed external electron donor provides a catalyst composition that is self-limiting and produces propylene-based polymers with high stiffness and high melt flow in a single polymerization reactor under standard polymerization conditions. Not wishing to be bound by any particular theory, it is believed that the ALA improves operability in the polymerization reactor by preventing a run-away reaction, polymer sheeting, and/or polymer agglomeration caused by excessive heat. Provision of SCA1 and SCA2 enables the formation of a high stiffness (i.e., $T_{MF}$ greater than 170° C.)/high melt flow (i.e., greater than 50, or 60, or 70, or 100 g/10 min) propylene-based polymer with utilization of standard hydrogen levels.

In particular, the present process advantageously produces a propylene-based polymer with high stiffness and high melt flow without visbreaking—a conventional technique for increasing the MFR beyond the hydrogen usage limitations of a reactor-grade high stiffness propylene-based polymer as described previously. The term "visbreaking" (or "cracking"), as used herein, is the thermal and/or chemical degradation of a polymer into smaller polymer chain segments. Visbreaking typically includes placing a polymer (such as polypropylene) in a melt state in the presence of a free radical initiator (such as a peroxide) to degrade the polypropylene into smaller polypropylene chain segments. Visbreaking is a post-reactor procedure. It is understood that the present processes for producing propylene impact copolymer are in-reactor, polymerization processes. Thus the present processes for producing propylene impact copolymer do not include visbreaking.

Visbreaking has many side effects such as formation of decomposition products (which oftentimes cause odor and food incompatibility problems), added cost, and a reduction in polymer stiffness. Visbreaking increases the melt flow yet decreases the weight average molecular weight of a polymer. Visbreaking alters the physical and chemical structure of the initial polymer. For example, a visbroken polypropylene homopolymer will exhibit a reduction in physical and/or mechanical properties (i.e. a lower tensile modulus, a lower flexural modulus) compared to an uncracked propylene homopolymer with the same MFR.

In an embodiment, the present process forms an uncracked propylene-based polymer. A polymer that is "uncracked" has not been subject to a visbreaking procedure. In other words, an uncracked polymer is a non-thermally and/or non-chemically degraded polymer. An uncracked polymer does not exhibit a decline of physical and/or mechanical properties related to molecular weight (such as flexural modulus and/or tensile properties), as does a visbroken polymer at the same MFR. In addition, an uncracked polymer does not experience decomposition products (which oftentimes cause odor and food incompatibility problems) as does a visbroken polymer.

In an embodiment, the process includes forming a propylene-based polymer having one or more of the following properties: (i) an uncracked propylene homopolymer; (ii) a MFR greater than 50 g/10 min, or greater than 60 g/10 min, or greater than 70 g/10 min, or greater than 100 g/10 min; (iii) a xylene solubles content of less than 4 wt %. or less than 3% wt %, or from about 0.1 wt % to less than 2.0 wt %; (iv) a $T_{MF}$ greater than about 165° C., or greater than 170° C.; (v) an ALA content of at least about 5 ppm to about 150 ppm; (vi) a post-reactor oligomer content ("oligomers" are $C_{12}$-$C_{21}$ compounds) less than 3000 ppm, or less than 2500 ppm, or from about 500 ppm to about 3000 ppm; and/or (vii) a post-reactor oligomer content about 10%, or about 20%, or about 40% less than the corresponding oligomer content of a propylene-based polymer formed by a catalyst composition which contains a single stiffness-promoting composition SCA (and optionally an ALA) under similar polymerization conditions. The term "post-reactor oligomer content," as used herein, is the oligomer content of the resultant propylene-based polymer immediately after exit from the polymerization reactor. In other words, "post-reactor oligomer content" is the oligomer content prior to any post-polymerization washing procedure, heating procedure, and/or refining procedure.

In an embodiment, the uncracked propylene-based polymer is a propylene homopolymer. In a further embodiment, the propylene-based polymer has low or no toxicity, low or no decomposition products, and low or no unpleasant odor.

In an embodiment, the active propylene-based polymer may be produced as disclosed in copending application Ser. No. 12/390,897, filed on Feb. 23, 2009, the entire content of which is incorporated by reference herein.

The present process includes introducing the active propylene-based polymer into a second polymerization reactor. In an embodiment, the first polymerization reactor and the second polymerization reactor operate in series, whereby the effluent from the first polymerization reactor is charged to the second polymerization reactor and one or more additional (or different) olefin monomer(s) is/are added to the second polymerization reactor to continue polymerization. In another embodiment, each of the first polymerization reactor and the second polymerization reactor is a gas phase polymerization reactor.

The process includes contacting the active propylene-based polymer with at least one olefin in the second polymerization reactor under polymerization conditions, and forming a propylene impact copolymer having a melt flow rate greater than about 60 g/10 min as measured in accordance with ASTM D1238-01. The at least one olefin includes an olefin other than propylene.

In an embodiment, the process includes forming an active propylene-based polymer with a MFR greater than 160 g/10 min and forming a propylene impact copolymer with a MFR greater than about 85 g/10 min. In another embodiment, the process includes forming an active propylene-based polymer with a MFR greater than 200 g/10 min and forming a propylene impact copolymer with an MFR greater than about 100 g/10 min. In another embodiment, the process includes forming an active propylene-based polymer with a MFR greater than about 300 g/10 min and forming a propylene impact copolymer with a MFR greater than about 150 g/10 min.

Propylene impact copolymer is a heterophasic copolymer. As used herein, a "heterophasic copolymer" is a multiple phase polymer having a continuous polymer phase (also referred to as the matrix phase) and a discontinuous polymer phase (also referred to as the elastomeric phase or the rubber phase, or rubber) dispersed within the continuous polymer phase. The propylene-based polymer produced in the first reactor is the continuous phase. The olefin is polymerized in the presence of the propylene-based polymer in the second reactor and forms the discontinuous phase. A heterophasic copolymer may contain more than two polymer phases.

The olefin introduced in the second reactor may be propylene, ethylene, a $C_{4-20}$ α-olefin (such as 1-butene, 1-pentene, 1-hexene, 4-methyl-1-pentene, 1-heptene, 1-octene, 1-decene, 1-dodecene and the like), or any combination thereof. In an embodiment, propylene and ethylene are contacted with the active propylene-based polymer in the second reactor to form a propylene impact copolymer with a propylene/ethylene copolymer as the discontinuous phase.

In an embodiment, the propylene impact copolymer has an Fc value from about 5 wt % to about 50 wt %, or from about 10 wt % to about 40 wt %, or from about 20 wt % to about 30 wt %. As used herein, "fraction copolymer" ("Fc") is the weight percent of the discontinuous phase present in the heterophasic copolymer. The Fc value is based on the total weight of the propylene impact copolymer.

The propylene impact copolymer may have an Ec value from about 20% wt to about 90 wt %, or from about 30 wt % to about 80 wt %, or from about 40 wt % about 60 wt %. As used herein, "ethylene content" ("Ec") is the weight percent of ethylene present in the discontinuous phase of the propylene impact copolymer. The Ec value is based on the total weight of the discontinuous (or rubber) phase.

In an embodiment, the polymerization process includes maintaining a hydrogen-to-propylene ("$H_2/C_3$") mole ratio less than 0.3 in the first polymerization reactor, and/or in the second polymerization reactor. It has been found that propylene-based polymers produced by way of a $H_2/C_3$ mole ratio greater than 0.3 contain excessive amounts of catalytic residue such as titanium and/or chlorine. The resultant propylene-based polymer formed by way of the present process avoids excessive amounts of catalytic residue as the $H_2/C_3$ mole ratio is less than 0.3.

In a further embodiment, the process includes maintaining a $H_2/C_3$ mole ratio of less than 0.10, or less than 0.08, or less than 0.04, or less than 0.03, in the second polymerization reactor. Applicants have surprisingly and unexpectedly discovered that maintaining the $H_2/C_3$ mole ratio to less than 0.3 (and/or maintaining the $H_2/C_3$ mole ratio to less than 0.1 in the second reactor) lowers hydrogen consumption and improves catalyst activity as a smaller presence of hydrogen lowers the partial pressure of the propylene and/or other olefin.

Not bounded by any particular theory, it is believed that the catalyst composition of the present process contributes to the low level of volatiles content of the resultant propylene impact copolymer. In an embodiment, the process includes forming a propylene impact copolymer having a volatiles content of less than about 65 μg/g. As used herein, "volatiles" are carbon-containing substances that are driven off as vapor at room temperature or slightly elevated temperatures, from a polymer. The volatiles content is less than about 65 μg/g, or less than about 60 μg/g, or less than about 50 μg/g, or from about 10 μg/g to less than about 65 μg/g. The volatiles content is determined in accordance with Volkswagen (VW) standard PV-3341.

The low amount of volatiles content of the present propylene impact copolymer advantageously reduces, or eliminates, a subsequent purge procedure. Conventional propylene impact copolymers typically require a nitrogen purge and/or a steam purge (for several days) in order to reduce the volatiles content to acceptable levels—particularly for applications requiring low volatiles content, such as food container applications. The low volatiles content of the present propylene impact copolymer decreases purge time or eliminates a purge procedure altogether.

In an embodiment, the process includes self-limiting the polymerization reaction when the temperature is greater than 100° C. in the first polymerization reactor and/or the second polymerization reactor. Not wishing to be bound by any particular theory, it is believed that the ALA improves operability in the polymerization reactor by preventing a run-away reaction, polymer sheeting, and/or polymer agglomeration caused by excessive heat formed during polymerization in either reactor.

In an embodiment, the process includes introducing, M-EED, or one or more components thereof, into the second reactor. Thus, the first selectivity control agent (SCA1), the second selectivity control agent (SCA2), and/or the activity limiting agent (ALA), separately, or in any combination, may be added to the second reactor.

The process may comprise two or more embodiments disclosed herein.

The present disclosure provides another process. In an embodiment, a polymerization process is provided which includes contacting, in a polymerization reactor under polymerization conditions, at least one olefin with an active propylene-based polymer. The active propylene-based polymer has a melt flow rate greater than about 100 g/10 min.

The process further includes forming a propylene impact copolymer having a melt flow rate of at least 85 g/10 min as measured in accordance with ASTM D-1238-01 (230° C., 2.16 kg weight). In an embodiment, the propylene-based polymer has a MFR greater than about 150 g/10 min and the propylene impact copolymer has a MFR greater than about 100 g/10 min. In another embodiment, the propylene-based polymer has a MFR greater than about 200 g/0 min and the propylene impact copolymer has a MFR greater than about 150 g/10 min.

In an embodiment, the polymerization occurs by way of gas phase polymerization. In other words, the contact between the active propylene-based polymer and the olefin(s) occurs in a gas phase polymerization reactor under polymerization conditions. The polymerization reactor may be the second polymerization reactor as disclosed above.

In an embodiment, the process includes maintaining a $H_2/C_3$ mole ratio of less than 0.20, or less than 0.10, or less than 0.08, or less than 0.04, or less than 0.03 during formation of the propylene impact copolymer.

In an embodiment, the process includes self-limiting the polymerization with a catalyst composition embedded in the active propylene-based polymer when the temperature in the polymerization reactor is greater than about 100° C. The catalyst embedded in the active propylene-based polymer may be the catalyst composition disclosed herein having a procatalyst, a cocatalyst and a mixed external electron donor (M-EED) comprising a first selectivity control agent (SCA1), a second selectivity control agent (SCA2), and an activity limiting agent (ALA).

In an embodiment, the process includes introducing, M-EED, or one or more components thereof, into the reactor. Thus, the first selectivity control agent (SCA1), the second selectivity control agent (SCA2), and/or the activity limiting agent (ALA), separately, or in any combination, may be added to the polymerization reactor.

In an embodiment, the active propylene-based polymer is contacted with propylene and ethylene. The process includes forming a propylene impact copolymer with an Fc value from about 5 wt % to about 50 wt %, and an Ec value from about 20 wt % to about 90 wt %.

In an embodiment, the process includes melt blending a nucleating agent with the propylene impact copolymer and forming a nucleated propylene impact copolymer. As used herein, "melt blending" is a process in which a polymer is softened and/or melted and mixed with one or more other compounds. Nonlimiting examples of melt blending processes include extrusion, melt mixing (batch or continuous), reactive melt blending, and/or compounding.

The nucleating agent reduces the size of crystallites, thereby improving the transparency and clarity of articles made from the propylene impact copolymer. Not wishing to be bound by any particular theory, it is believed that the nucleating agent provides sites for more ordered and faster polyolefin crystallization during cooling. During the process of crystallization, polymer crystals organize into larger superstructures which are referred to as spherulites. The spherulites are more uniform and are smaller in size than spherulites formed in the absence of the nucleating agent.

Various nucleating agents known in the art may be used without limitation. Nonlimiting examples of suitable nucleating agents include sodium benzoate, aluminum adipate; aluminum p-t-butylbenzoate; sorbitol acetal derivatives such as 1,3,2,4-dibenzylidenesorbitol, 1,3,2,4-bis(p-methyl-benzylidene)sorbitol, 1,3,2,4-bis(p-ethylbenzylidene)-sorbitol, 1,3-p-chlorobenzylidene-2,4-p-methylbenzylidene-sorbitol, 1,3-O-2,4-bis(3,4-dimethylbenzylidene)sorbitol, (available from Milliken Chemical Spartanburg, S.C. under the trade name Millad® 3988), 1,3-O-2,4-bis(p-methylbenzylidene) sorbitol (also available from Milliken Chemical under the trade name Millad® 3940); sodium bis(4-t-butylphenyl) phosphate; sodium bis(4-t-methylphenyl)phosphate; potassium bis(4,6-di-t-butylphenyl)phosphate; sodium 2,2'-methylene-bis(4,6-di-t-butylphenyl)phosphate (NA-11); sodium 2,2'-ethylidene-bis(4,6-di-t-butylphenyl)phosphate; talc; calcium carbonate; and any combination of the foregoing.

In an embodiment, the process includes forming a propylene impact copolymer having a volatiles content of less than about 65 µg/g. The volatiles content is less than about 65 µg/g, or less than about 60 µg/g, or less than 50 µg/g, or from about 10 µg/g to less than about 65 µg/g.

The process may comprise two or more embodiments disclosed herein.

The present disclosure provides a propylene impact copolymer. The propylene impact copolymer includes a propylene-based polymer (matrix phase) with a propylene/ethylene copolymer (discontinuous phase) dispersed therein. The propylene-based polymer has a MFR greater than about 100 g/10 min. The propylene impact copolymer has a melt flow rate greater than about 60 g/10 min, an Fe value from about 5 wt % to about 50 wt %, an Ec value from about 20 wt % to about 90 wt %.

In an embodiment, the propylene-based polymer has a MFR greater than about 160 g/10 min and the propylene impact copolymer has a MFR greater than about 85 g/10 min. In another embodiment, the propylene-based polymer has a MFR greater than about 200 g/10 min and the propylene impact copolymer has a MFR greater than about 100 g/10 min. In an embodiment, the propylene-based polymer has a MFR greater than about 300 g/10 min and the propylene impact copolymer has a MFR greater than about 150 g/10 min. In a further embodiment, the propylene-based polymer is a propylene homopolymer.

In an embodiment, the propylene-based polymer has one or more of the following properties: xylene solubles content of less than about 4 wt %, or less than about 2 wt %; and a $T_{MF}$ greater than about 170° C.

In an embodiment, no polymer component of the propylene impact copolymer is cracked. In other words, the propylene impact copolymer is uncracked, the propylene-based polymer is uncracked, and the propylene/ethylene copolymer is uncracked.

In an embodiment, the propylene impact copolymer has a volatiles content of less than 65 µg/g, or less than about 60 µg/g, or less than 50 µg/g, or from about 10 g/g to less than about 65 µg/g (VW PV3341).

In an embodiment, the propylene impact copolymer has an ALA content of at least 5 ppm, or at least 10 ppm, or at least 20, ppm, or at least 30 ppm, or from about 5 ppm to about 150 ppm.

In an embodiment, the propylene impact copolymer is a nucleated propylene impact copolymer.

The present propylene impact copolymer may be used for a variety of applications such as automotive interior parts where low volatiles are required, and can be used for many food contact applications such as cups and containers. Additionally, many ordinary molded articles such as toys, pails, buckets, and general purpose articles can take advantage of the high melt flow product and impact strength properties and/or low volatiles content of the present propylene impact copolymer. The present propylene impact copolymer can also be used to produce fibers for carpets, upholstery, and diapers.

The propylene impact copolymer may comprise two or more embodiments disclosed herein.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term, "ethylene/α-olefin interpolymer," as used herein, refers to an interpolymer that comprises a majority weight percent polymerized ethylene monomer (based on the total amount of polymerizable monomers), and at least one polymerized α-olefin.

The term, "propylene-based polymer," as used herein, refers to a polymer that comprises a majority weight percent polymerized propylene monomer (based on the total amount of polymerizable monomers), and optionally may comprise at least one polymerized comonomer.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, 2-propenyl (or allyl), vinyl, n-butyl, t-butyl, i-butyl (or 2-methylpropyl), etc. The alkyls have 1 and 20 carbon atoms.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

Test Methods

Flexural modulus is determined in accordance with ASTM D790-00 Method I, using an ASTM D 638 Type 1 specimen tested at 1.3 mm/min.

Izod impact strength is measured in accordance with ASTM D256.

Melt flow rate (MFR) is measured in accordance with ASTM D 1238-01 test method at 230° C. with a 2.16 kg weight for propylene-based polymers.

Xylene Solubles (XS) is measured according to the following procedure. 0.4 g of polymer is dissolved in 20 ml of xylenes with stirring at 130° C. for 30 minutes. The solution is then cooled to 25° C. and after 30 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration was maintained with Viscotek PolyCAL™ polystyrene standards.

Final melting point $T_{MF}$ is the temperature to melt the most perfect crystal in the sample and is regarded as a measure for isotacticity and inherent polymer crystallizability. The test is conducted using a TA Q100 Differential Scanning Calorimeter. A sample is heated from 0° C. to 240° C. at a rate of 80° C./min, cooled at the same rate to 0° C., then heated again at the same rate up to 150° C., held at 150° C. for 5 minutes and the heated from 150° C. to 180° C. at 1.25° C./min. The $T_{MF}$ is determined from this last cycle by calculating the onset of the baseline at the end of the heating curve.

Testing Procedure:
(1) Calibrate instrument with high purity indium as standard.
(2) Purge the instrument head/cell with a constant 50 ml/min flow rate of nitrogen constantly.
(3) Sample preparation:
Compression mold 1.5 g of powder sample using a 30-G302H-18-CX. Wabash Compression Molder (30 ton): (a) heat mixture at 230° C. for 2 minutes at contact; (b) compress the sample at the same temperature with 20 ton pressure for 1 minute; (c) cool the sample to 45° F. and hold for 2 minutes with 20 ton pressure; (d) cut the plaque into 4 of about the same size, stack them together, and repeat steps (a)-(c) in order to homogenize sample.
(4) Weigh a piece of sample (preferably between 5 to 8 mg) from the sample plaque and seal it in a standard aluminum sample pan. Place the scaled pan containing the sample on the sample side of the instrument head/cell and place an empty sealed pan in the reference side. If using the auto sampler, weigh out several different sample specimens and set up the machine for a sequence.

(5) Measurements:
(i) Data storage: off
(ii) Ramp 80.00° C./min to 240.00° C.
(iii) Isothermal for 1.00 min
(iv) Ramp 80.00° C./min to 0.00° C.
(v) Isothermal for 1.00 min
(vi) Ramp 80.00° C./min to 150.00° C.
(vii) Isothermal for 5.00 min
(viii) Data storage: on
(ix) Ramp 1.25° C./min to 180.00° C.
(x) End of method
(6) Calculation: $T_{MF}$ is determined by the interception of two lines. Draw one line from the base-line of high temperature. Draw another line from through the deflection of the curve close to the end of the curve at high temperature side.

Volatiles content—is measured by the static Headspace Analysis described in the textbook: Pyrolysis and GC in Polymer Analysis, edited by S. A. Liebman and E. J. Levy, Marcel Dekker, Inc., 1985. The gas chromatography/headspace gas chromatography (GC-HS) analysis is widely used in the automotive industry. The company Volkswagen AG has developed a standard, which is generally accepted and used in the plastic industry. It is known as "VW standard PV 3341" (or "PV3341"). PV 3341 is a test in which a sample of 2 grams is placed into a headspace vial, conditioned for 5 hours at 120° C. and then injected into a GC. Quantification is accomplished using an external standard technique based on peak area response of acetone standards.

By way of example and not by limitation, examples of the present disclosure will now be provided.

EXAMPLES (1) Procatalysts

SHAC 320 is a Ziegler-Natta procatalyst composition composed of titanium, magnesium, and an internal electron donor of di-isobutylphthalate and prepared according to example 1 in U.S. Pat. No. 6,825,146, the entire content of which is incorporated by reference herein.

Procatalyst FV is a Ziegler-Natta procatalyst composition composed of titanium, magnesium, and an internal electron donor of a 1,3-diether as disclosed in European Patent Application No. 728,769. The FV procatalyst is prepared as follows.

At ambient temperature, 350 g of a mixed magnesium/titanium halide alcoholate, 72 g of 9,9-bis(methoxymethyl)-9H-fluorene, and 5.6 L of a 50/50 (vol/vol) mixture of titanium(IV) chloride and chlorobenzene are combined. The mixture is agitated at 105-115° C. for 60 min, allow to settle, and filtered at 100° C. The solids are agitated in 2.8 L of chlorobenzene at 85° C., allowed to settle, and filtered at 85° C. The solids are twice stirred in 5.6 L of a fresh mixture of 50/50 titanium(IV) chloride and chlorobenzene at 105-115° C. for 30 min, is allowed to settle, and is filtered at 100° C. After cooling, the solids are washed twice with 5.2 L of hexane at 50-60° C., followed by a final wash with 5.6 L of 2-methylbutane at ambient temperature. The solids are combined with 1.19 kg of mineral oil, and the resulting slurry was subjected to vacuum to remove residual volatiles.

(2) External Electron Donors

Samples A-E include a mixed external electron donor (M-EED) with the M-EED components selected from the following:
DCPDMS: dicyclopentyldimethoxysilane (SCA)
IPM: isopropyl myristate (ALA)
PTES: n-propyltriethoxysilane (SCA2)
TEOS: tetraethoxysilane (SCA2)

Sample F includes an external electron donor with components selected from the following.
DCPDMS: dicyclopentyldimethoxysilane (SCA)
IPM: isopropyl myristate (ALA)

Samples G and H are conventional impact copolymers. Sample H is prepared with a catalyst composition which includes dicyclopentyldimethoxysilane as the external electron donor. Samples G and H are provided as comparisons and are not embodiments of the present disclosure.

(3) Polymerization

Production of the samples A-F and sample H is performed in the gas phase using linked fluidized bed reactors such as described in U.S. Pat. No. 4,882,380, the entire content of which is incorporated by reference herein. Polymerization conditions are those listed in Table 2 below.

Sample G is a conventional impact copolymer that is made in a Spheripol process, a known multi-stage process using a liquid phase polymerization reactor in the first stage, followed by one or two additional gas phase polymerization reactors for the production of the rubber phase. The finished grade is a reactor grade (i.e., not visbroken).

As a final step in the production of samples A-F, each sample is semi-continuously discharged into a fiberpak and sparged (or deactivated) with wet nitrogen at 22° C., using approximately 3 kg of water per 1000 kg of resin for a period up to 3 hours.

After resin from sample H is discharged from the reactor, it is deactivated by purging for 1-3 hours with wet nitrogen at 22° C., using 1 kg of water per 1000 kg of polymer.

Samples A-F and H are compounded with the additives listed in Table 4 using twin screw, intermeshing extruders. No purging is done on these samples following the compounding.

TABLE 2

|  | A | B | C | D | E | F | G* | H* |
|---|---|---|---|---|---|---|---|---|
|  |  |  |  | Catalyst |  |  |  |  |
|  | SHAC 320 | SHAC 320 | SHAC 320 | SHAC 320 | SHAC 320 | FV |  | SHAC 320 |
| Rx 1 Conditions |  |  |  |  |  |  |  |  |
| Rx 1 $H_2/C_3$ | 0.144 | 0.15 | 0.177 | 0.188 | 0.192 | 0.075 |  | 0.178 |
| Rx Temp (C.) | 70 | 70 | 70 | 70 | 70 | 70 |  | 65 |
| Molar Al/DCPDMS | 21.0 | 13.3 | 21.0 | 13.3 | 13.3 | 4.3 |  | 1 |

TABLE 2-continued

|  | A | B | C | D | E | F | G* | H* |
|---|---|---|---|---|---|---|---|---|
|  |  |  |  | Catalyst |  |  |  |  |
|  | SHAC 320 | SHAC 320 | SHAC 320 | SHAC 320 | SHAC 320 | FV |  | SHAC 320 |
| Molar Al/TEOS |  | 8.0 | na | 8.0 | 8.0 | na |  | na |
| Molar/Al/PTES | 7.0 | na | 7.0 | na | na | na |  | na |
| Molar/Al/IPM | 3.5 | 3.3 | 3.5 | 3.3 | 3.3 | 2.8 |  | na |
| Rx 1 Al/SCA | 2.1 | 2 | 2.1 | 2 | 2 | 1.7 |  | 1 |
| Rx 1 Al/Ti | 49 | 49 | 49 | 49 | 49 | 49 |  | 40 |
| Propylene partial pressure (kPa) |  | 2208 | 2208 | 2208 | 2208 | 2202 |  | 2622 |
| Rx 1 residence time (hours) | 2.7 | 2.9 | 3.1 | 3 | 2.9 | 3.3 |  | 1.3 |
| MFR (homopolymer) dg/min | 139.0 | 153.0 | 210.0 | 195.0 | 205.0 | 187.0 |  | 61 |
| XS (homopolymer) wt % | 1.7 | 1.6 | 2.3 | 1.7 | 1.8 | 1.8 |  | 1.6 |
| RX 2 Conditions |  |  |  |  |  |  |  |  |
| Rx 2 Temp (C.) | 70 | 70 | 70 | 70 | 70 | 70 |  | 70 |
| Rx 2 Propylene partial pressure (psi) | 95 | 78 | 93 | 88 | 81 | 82 |  | 41 |
| Rx 2 residence time (hours) | 2 | 2.1 | 2.1 | 2 | 2 | 2 |  | 1 |
| Rx 2 $H_2/C_3$ | 0.023 | 0.022 | 0.023 | 0.022 | 0.021 | 0.017 |  | 0.096 |
| Volatiles Content (μg/g) | 47.7 | 55.6 |  |  | 58.45 | 46.9 | 70.4 | 125 |
| Pellet Product Properties |  |  |  |  |  |  |  |  |
| MFR (g/10 min) | 78 | 74 | 80 | 90 | 108 | 82 | 82 | 33 |
| Ec (% wt) | 44.5 | 45.2 | 43.4 | 44.3 | 44.5 | 43.4 | 49.3 | 52 |
| Fc (% wt) | 17.3 | 16.9 | 18.5 | 18.2 | 17.3 | 18.4 | 18.9 | 17 |
| Non-nucleated |  |  |  |  |  |  |  |  |
| ISO Flex Chord (psi) | 173,455 | 176,146 | 162,116 | 169,689 | 170,574 | 157,451 |  |  |
| ISO Flex Chord (MPa) | 1,197 | 1,215 | 1,119 | 1,171 | 1,177 | 1,086 |  |  |
| ISO Notched Izod @23 C. (KJ/M$^2$) | 7.63 | 8.39 | 9.73 | 9.47 | 8.4 | 9.85 |  |  |
| ISO Charpy at 23° C. (KJ/M$^2$) | 7.21 | 7.85 | 8.42 | 8.31 | 7.83 | 9.2 |  |  |

*= Comparative

TABLE 3

|  | A | B | C | D | E | F | G* | H* |
|---|---|---|---|---|---|---|---|---|
| Nucleated with 1000 ppmw NA-11 |  |  |  |  |  |  |  |  |
| ISO Flex Chord (psi) | 221,093 | 221,552 | 210,400 |  | 218,637 | 197,370 |  |  |
|  | 1,526 | 1,529 | 1,452 |  | 1,509 | 1,362 |  |  |
| ISO Notched Izod @23 C. (KJ/M$^2$) | 7.49 | 7.81 | 8.08 |  | 7.02 | 10 |  |  |
| ISO Charpy at 23° C. (KJ/M$^2$) | 7.21 | 7.63 | 8.27 |  | 6.59 | 10 |  |  |
| Nucleated with 500 ppmw NaBz |  |  |  |  |  |  |  |  |
| ISO Flex Chord (MPa) | 1,380 | 1,396 |  |  |  | 1,413 | 1493** |  |

TABLE 3-continued

|  | A | B | C | D | E | F | G* | H* |
|---|---|---|---|---|---|---|---|---|
| ISO Notched Izod @23 C. (KJ/M²) | 7.14 | 8.03 |  |  |  |  | 7.4 | 8.3** |
| ISO Charpy at 23° C. (KJ/M²) | 7.4 | 7.4 |  |  |  |  | 6.8 |  |
| ASTM 1% secant flex modulus (MPa) |  |  |  |  |  |  |  | 1539 |
| ASTM RT Izod (J/m) |  |  |  |  |  |  |  | 76 |

*= Comparative
**= Values calculated based on a correlation to the ASTM values listed in the table

TABLE 4

Additives (ppmw)

| | Examples A-G |
|---|---|
| Irganox 1010 (hindered phenolic antioxidant) | 1000 |
| Irgafos 168 (Phosphite Antioxidant) | 1000 |
| GMS (glycerol monostearate) | 6000 |
| Calcium Stearate (acid acceptor) | 600 |

If nucleated with NA-11

| | |
|---|---|
| NA-11—nucleating agent | 1000 |

If nucleated with NaBz

| | |
|---|---|
| Calcium Stearate | 0 |
| Zinc Oxide (acid acceptor) | 200 |
| NaBz (Sodium Benzoate) | 500 |

| | Example H |
|---|---|
| Irganox 1010 | 750 |
| P-EPQ—Phosphite Antioxidant | 750 |
| Acrawax C Lubricant | 500 |
| DHT-4A Zeolite Acid Acceptor | 250 |
| NaBz | 500 |

Samples A-F have a lower volatiles content than comparative Sample H in spite of the fact that Samples A-F each have a higher MFR than Sample H.

Sample F shows that by using a different catalyst (FV catalyst) in combination with IPM and DCPDMS the same result can be achieved, namely, the production of a propylene impact copolymer with high melt flow and a low volatiles content. Furthermore, by using IPM in combination with DCPDMS (and optionally the other silanes) a lower amount of DCPDMS is needed, providing a further cost reduction since the DCPDMS is more costly.

Samples A and B each has the same, or substantially the same, impact and stiffness properties as Sample G (using substantially the same, or the same, additives). Surprisingly and unexpectedly, the present propylene impact copolymer produced in the gas phase is superior in volatiles content. In particular, samples A and B each have a smaller volatiles content than sample G.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A polymerization process comprising:
   contacting propylene and optionally at least one other olefin with a catalyst composition in a first polymerization reactor under gas phase polymerization conditions, the catalyst composition comprising a procatalyst having a diether internal electron donor which is 9,9-bis(methoxymethyl)-9H-fluorene, a cocatalyst and a mixed external electron donor (M-EED) comprising a first selectivity control agent (SCA1) which is dicyclopentyldimethoxysilane and an activity limiting agent (ALA) which is isopropyl myristate;
   forming, in the first polymerization reactor, an active propylene-based polymer having a melt flow rate greater than 100 g/10 min as measured in accordance with ASTM D1238-01 (230° C., 2.16 kg);
   contacting the active propylene-based polymer with at least one olefin in a second reactor under polymerization conditions; and
   forming a propylene impact copolymer having a melt flow rate greater than 60 g/10 min and an Izod impact strength of 9.85 kJ/m².

2. The process of claim 1 comprising maintaining a $H_2/C_3$ mole ratio of less than 0.3 in one or both reactors.

3. The process of claim 1 comprising maintaining a $H_2/C_3$ mole ratio of less than 0.1 in the second polymerization reactor.

4. The process of claim 1 comprising introducing into the second reactor, a component selected from the group consisting of a mixed external electron donor (M-EED), a first selectivity control agent (SCA1), a second selectivity control agent (SCA2), an activity limiting agent (ALA), and combinations thereof.

5. The process of claim 1 comprising contacting the active propylene-based polymer with propylene and ethylene and forming a propylene impact copolymer having an Fc value from about 5 wt % to about 50 wt % and an Ec value from about 20 wt % to about 90 wt %.

6. The process of claim 1 comprising forming a propylene impact copolymer having a volatiles content of less than 65 μg/g as measured in accordance with VW standard PV3341.

7. The process of claim 1 comprising self-limiting the polymerization with the catalyst composition when the temperature is greater than 100° C. in a reactor selected from the group consisting of the first polymerization reactor, the second polymerization reactor, and combinations thereof.

8. A polymerization process comprising:
   contacting, in a polymerization reactor under polymerization conditions, at least one olefin with an active propylene-based polymer having a melt flow rate greater than 100 g/10 min as measured in accordance with ASTM D-1238-01 (230° C., 2.16 kg) and a catalyst composition comprising a procatalyst having a diether internal electron donor which is 9,9-bis(methoxymethyl)-9H-fluorene and an activity limiting agent (ALA) which is isopropyl myristate; and forming a propylene impact copolymer having a melt flow rate greater than 85 g/10 min, an Izod impact strength of 9.85 kJ/m², and at least 5 ppm of the ALA.

9. The process of claim 8 comprising contacting the at least one olefin with the active propylene-based polymer in a gas phase polymerization reactor.

10. The process of claim 8 comprising maintaining a $H_2/C_3$ mole ratio of less than 0.2.

11. The process of claim 8 wherein the active propylene-based polymer comprises a self-limiting catalyst composition, the process comprising self-limiting the polymerization when the temperature in the polymerization reactor is greater than 100° C.

12. The process of claim 8 comprising contacting propylene and ethylene with the active propylene-based polymer; and forming a propylene impact copolymer having an Fc value from about 5 wt % to about 50 wt % and an Ec value from about 20 wt % to about 90 wt %.

13. The process of claim 8 comprising forming a propylene impact copolymer having a volatiles content of less than 65 μg/g as measured in accordance with VW standard PV3341.

14. A propylene impact copolymer comprising:
a propylene-based polymer having a melt flow rate (MFR) greater than 100 g/10 min as measured in accordance with ASTM D-1238-01 (230° C., 2.16 kg);
a propylene/ethylene copolymer dispersed within the propylene-based polymer, and
the propylene impact copolymer having a melt flow rate greater than 60 g/10 min, an Fc value from about 5 wt % to about 50 wt %, an Ec value from about 20 wt % to about 90 wt %, an Izod impact strength of 9.85 kJ/m² and at least 5 ppm of an activity limiting agent (ALA) which is isopropyl myristate.

15. The propylene impact copolymer of claim 14 wherein the MFR of the propylene-based polymer is greater than 160 g/10 min and the MFR of the impact copolymer is greater than 85 g/10 min.

16. The propylene impact copolymer of claim 14 wherein the propylene-based polymer has a xylene solubles content less than 4%.

17. The propylene impact copolymer of claim 14 wherein the propylene-based polymer is uncracked.

18. The propylene impact copolymer of claim 14 comprising a volatiles content of less than 65 μg/g as measured in accordance with VW standard PV3341.

19. The propylene impact copolymer of claim 14 having a $T_{mf}$ greater than 170° C.

* * * * *